(12) United States Patent
Lu et al.

(10) Patent No.: US 10,222,907 B2
(45) Date of Patent: Mar. 5, 2019

(54) TOUCH DISPLAY PANEL AND DRIVE CIRCUIT, ELECTRONIC APPARATUS THEREOF

(71) Applicant: Wuhan China Star Optoelectronics Technology Co., Ltd., Wuhan, Hubei (CN)

(72) Inventors: Yucheng Lu, Guangdong (CN); Feilin Ji, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 378 days.

(21) Appl. No.: 15/110,085

(22) PCT Filed: May 23, 2016

(86) PCT No.: PCT/CN2016/082975
§ 371 (c)(1),
(2) Date: Jul. 6, 2016

(87) PCT Pub. No.: WO2017/190377
PCT Pub. Date: Nov. 9, 2017

(65) Prior Publication Data
US 2018/0113561 A1    Apr. 26, 2018

(30) Foreign Application Priority Data

May 4, 2016    (CN) .......................... 2016 1 0288584

(51) Int. Cl.
*G06F 3/041* (2006.01)
*G02F 1/1362* (2006.01)
(Continued)

(52) U.S. Cl.
CPC .......... *G06F 3/0418* (2013.01); *G02F 1/1368* (2013.01); *G02F 1/136286* (2013.01);
(Continued)

(58) Field of Classification Search
CPC combination set(s) only.
See application file for complete search history.

(56) References Cited

U.S. PATENT DOCUMENTS

2005/0156864 A1* 7/2005 Fujikura .............. G09G 3/3688
345/100
2011/0037741 A1 2/2011 Chiang et al.
2013/0135281 A1* 5/2013 Hou ..................... G09G 3/3648
345/212

FOREIGN PATENT DOCUMENTS

CN           1637838 A    7/2005
CN         102508374 A    6/2012
(Continued)

*Primary Examiner* — Robin J Mishler
(74) *Attorney, Agent, or Firm* — Andrew C. Cheng

(57) ABSTRACT

The touch display panel drive circuit provided by the present invention comprises a data line drive unit, a plurality of gate lines and a plurality of data lines, and a junction of two adjacent gate lines and two adjacent data lines forms a pixel region, and a pixel switch is located inside the pixel region; the touch display panel drive circuit further comprises a data line switch between the data line and the data line drive unit; as the data line drive unit does not output the data signal, an output of the data line switch is a high-impedance state, and the data line drive unit is disconnected with the pixel switch. The present invention can prevent the error reading phenomenon generated by the transistor leakage, and can enhance the display brightness and the stability of the display image, and promote the display effect of the touch display panel.

17 Claims, 1 Drawing Sheet

(51) Int. Cl.
*G02F 1/1368* (2006.01)
*G06F 3/044* (2006.01)
*G09G 3/36* (2006.01)
*G02F 1/1333* (2006.01)

(52) U.S. Cl.
CPC ............ *G06F 3/044* (2013.01); *G06F 3/0412* (2013.01); *G09G 3/3607* (2013.01); *G09G 3/3688* (2013.01); *G02F 1/13338* (2013.01); *G02F 2201/121* (2013.01); *G02F 2201/123* (2013.01); *G09G 2300/0452* (2013.01); *G09G 2320/0214* (2013.01); *G09G 2330/023* (2013.01)

(56) References Cited

FOREIGN PATENT DOCUMENTS

| | | |
|---|---|---|
| CN | 104503173 A | 4/2015 |
| CN | 104598089 A | 5/2015 |
| CN | 104699313 A | 6/2015 |
| CN | 104765498 A | 7/2015 |

\* cited by examiner

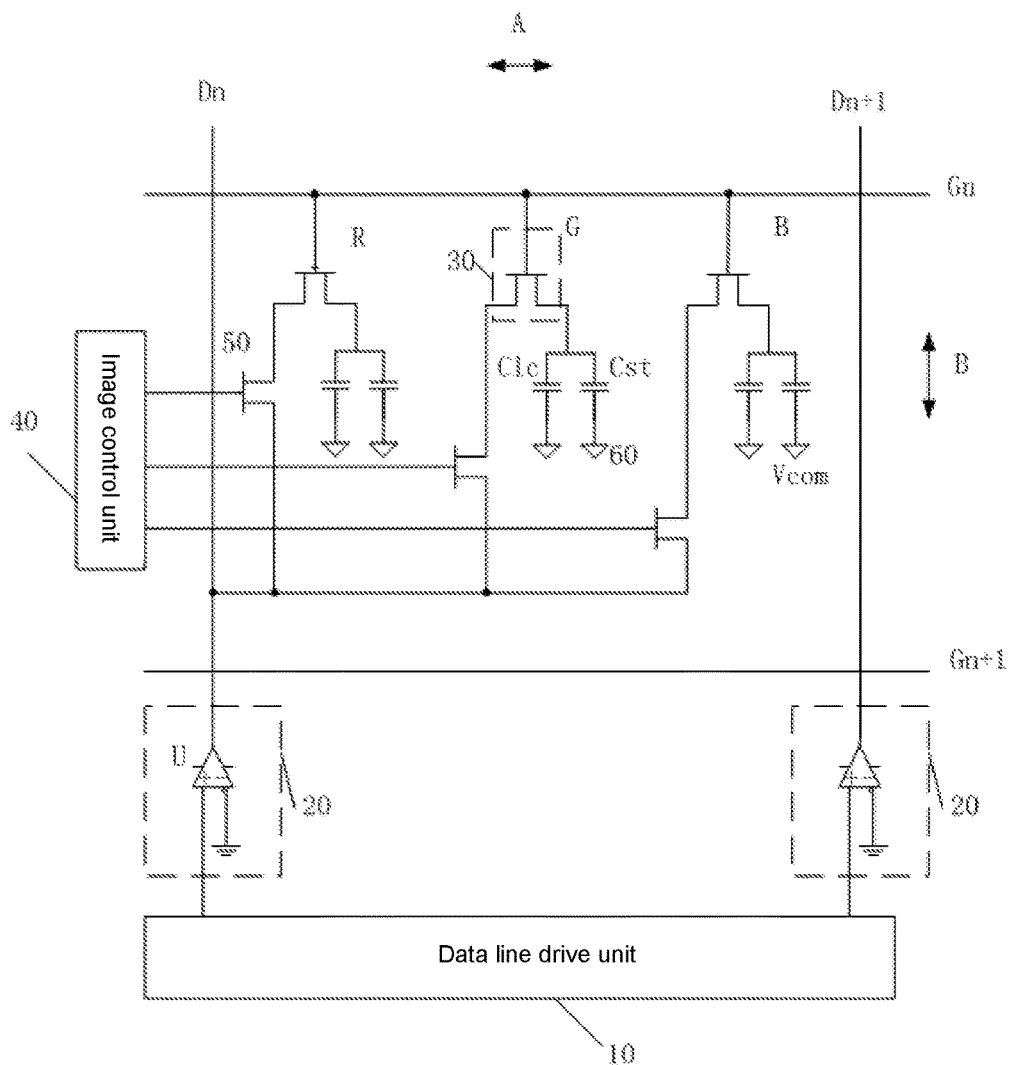

TOUCH DISPLAY PANEL AND DRIVE CIRCUIT, ELECTRONIC APPARATUS THEREOF

CROSS REFERENCE

This application claims the priority of Chinese Patent Application No. 201610288584.6, entitled "Touch display panel and drive circuit, electronic apparatus thereof", filed on May 4, 2016, the disclosure of which is incorporated herein by reference in its entirety.

FIELD OF THE INVENTION

The present invention relates to a touch display technology field, and more particularly to a touch display panel and a drive circuit, an electronic apparatus thereof.

BACKGROUND OF THE INVENTION

With the population of the smart electronic products, the capacitive touch panel has been widely applied in kinds of electronic products, such as the cellular phone, the tablet and etc. At present, the more common capacitive touch panels are three kinds of OGS (One Glass Solution), On-Cell and In-Cell. The In-Cell has the advantage in manufacture process. In comparison with the OGS and the On-Cell, it has advantages of being thinner, having better light transmittance and possessing more stable structure.

As being one embodiment of the In-Cell optical touch control, the prior art generally sets a gate and a transistor coupled with one gate line of the pixel of the row. Meanwhile, one of the source and the drain of the transistor is coupled to one data line of the pixel of the column, and the other is coupled to the capacitor which is employed to store the touch signals. Thus, the transistor can achieve the scan reading to the touch signal of each pixel unit.

However, the transistor has the condition of leakage current. Therefore, as scanning and reading the touch signals of the pixel units of one row, the data line may have the possibility to receive the noise signal generated by the leakage current of the other rows to result in the occurrence of the error reading phenomenon. Besides, the error reading of the touch will occupy the display duration many times to increases the entire power consumption. Ultimately, it leads to the decrease of the screen brightness, the unstable display image and the display effect decrease.

SUMMARY OF THE INVENTION

An objective of the present invention is to provide a touch display panel drive circuit, which can prevent the occurrence of the leakage phenomenon and the error reading, and meanwhile, can reduce the power consumption of the circuit to enhance the display brightness and the stability of the display image, and promote the display effect of the touch display panel.

Another objective of the present invention is to provide a touch display panel utilizing the aforesaid drive circuit.

Another objective of the present invention is to provide an electronic apparatus utilizing the aforesaid touch display panel.

For realizing the aforesaid objective, the technical solution provided by the embodiments of the present invention is:

the present invention provides a touch display panel drive circuit, wherein the touch display panel drive circuit comprises a data line drive unit, a plurality of gate lines and a plurality of data lines, and the data line drive unit is employed to generate a data signal, and to provide the same to the plurality of data lines, and the plurality of gate lines are extended in a first direction and separately aligned along a second direction, and the plurality of data lines are extended in the second direction and separately aligned along the first direction, and the plurality of data lines and the plurality of gate lines are insulated, and a junction of two adjacent gate lines and two adjacent data lines forms a pixel region, and a pixel switch is located inside the pixel region; the touch display panel drive circuit further comprises a data line switch between the data line and the data line drive unit;

as the data line drive unit does not output the data signal, an output of the data line switch is a high-impedance state, and the data line drive unit is disconnected with the pixel switch.

As the data line drive unit outputs the data signal, the data line switch is conducted, and the data line drive unit and the pixel switch form a path.

The data line switch comprises a voltage comparator, and a non-inverting input end of the voltage comparator is electrically coupled to the data line drive unit, and the inverting input end of the voltage comparator is grounded, and an output end of the voltage comparator is electrically coupled to the pixel switch through the data line.

Each pixel region comprises three pixel switches, and the three pixel switches respectively control a red sub pixel, a green sub pixel and a blue sub pixel.

The touch display panel drive circuit further comprises an image control unit and three pixel select switches, and each of the pixel select switches is between one of the pixel switch and the data line switch, and the image control unit controls on and off of the pixel select switch, and as the pixel select switch is on, the pixel switch corresponded with the pixel select switch is on.

The pixel switch comprises a first thin film transistor, and the pixel select switch comprises a second thin film transistor, and a gate of the first thin film transistor is electrically coupled to the gate, and a source of the first thin film transistor is electrically coupled to a drain of the second thin film transistor, and a drain of the first thin film transistor is electrically coupled to a capacitor, and a gate of the second thin film transistor is electrically coupled to the image control unit, and a source of the second thin film transistor is electrically coupled to the data line drive unit.

The first thin film transistor is a PMOS thin film transistor, a NMOS thin film transistor or a CMOS thin film transistor; the second thin film transistor is a PMOS thin film transistor, a NMOS thin film transistor or a CMOS thin film transistor.

The capacitor comprises a liquid crystal capacitor and a storage capacitor, and one end of the liquid crystal capacitor is electrically coupled to the drain of the first thin film transistor, and the other end is coupled to a common electrode, and one end of the storage capacitor is electrically coupled to the drain of the first thin film transistor, and the other end is coupled to the common electrode.

The present invention provides a touch display panel comprising a drive circuit, wherein the drive circuit comprises a data line drive unit, a plurality of gate lines and a plurality of data lines, and the data line drive unit is employed to generate a data signal, and to provide the same to the plurality of data lines, and the plurality of gate lines are extended in a first direction and separately aligned along a second direction, and the plurality of data lines are extended in the second direction and separately aligned along the first direction, and the plurality of data lines and the plurality of gate lines are insulated, and a junction of two adjacent gate lines and two adjacent data lines forms a pixel region, and a pixel switch is located inside the pixel region; the touch display panel drive circuit further comprises a data line switch between the data line and the data line drive unit;

as the data line drive unit does not output the data signal, an output of the data line switch is a high-impedance state, and the data line drive unit is disconnected with the pixel switch.

As the data line drive unit outputs the data signal, the data line switch is conducted, and the data line drive unit and the pixel switch form a path.

The data line switch comprises a voltage comparator, and a non-inverting input end of the voltage comparator is electrically coupled to the data line drive unit, and the inverting input end of the voltage comparator is grounded, and an output end of the voltage comparator is electrically coupled to the pixel switch through the data line.

Each pixel region comprises three pixel switches, and the three pixel switches respectively control a red sub pixel, a green sub pixel and a blue sub pixel.

The touch display panel drive circuit further comprises an image control unit and three pixel select switches, and each of the pixel select switches is between one of the pixel switch and the data line switch, and the image control unit controls on and off of the pixel select switch, and as the pixel select switch is on, the pixel switch corresponded with the pixel select switch is on.

The pixel switch comprises a first thin film transistor, and the pixel select switch comprises a second thin film transistor, and a gate of the first thin film transistor is electrically coupled to the gate, and a source of the first thin film transistor is electrically coupled to a drain of the second thin film transistor, and a drain of the first thin film transistor is electrically coupled to a capacitor, and a gate of the second thin film transistor is electrically coupled to the image control unit, and a source of the second thin film transistor is electrically coupled to the data line drive unit.

The first thin film transistor is a PMOS thin film transistor, a NMOS thin film transistor or a CMOS thin film transistor; the second thin film transistor is a PMOS thin film transistor, a NMOS thin film transistor or a CMOS thin film transistor.

The capacitor comprises a liquid crystal capacitor and a storage capacitor, and one end of the liquid crystal capacitor is electrically coupled to the drain of the first thin film transistor, and the other end is coupled to a common electrode, and one end of the storage capacitor is electrically coupled to the drain of the first thin film transistor, and the other end is coupled to the common electrode.

The present invention provides an electronic apparatus, comprising a touch display panel and the touch display panel comprises a data line drive unit, a plurality of gate lines and a plurality of data lines, and the data line drive unit is employed to generate a data signal, and to provide the same to the plurality of data lines, and the plurality of gate lines are extended in a first direction and separately aligned along a second direction, and the plurality of data lines are extended in the second direction and separately aligned along the first direction, and the plurality of data lines and the plurality of gate lines are insulated, and a junction of two adjacent gate lines and two adjacent data lines forms a pixel region, and a pixel switch is located inside the pixel region; the touch display panel drive circuit further comprises a data line switch between the data line and the data line drive unit;

as the data line drive unit does not output the data signal, an output of the data line switch is a high-impedance state, and the data line drive unit is disconnected with the pixel switch.

As the data line drive unit outputs the data signal, the data line switch is conducted, and the data line drive unit and the pixel switch form a path.

The data line switch comprises a voltage comparator, and a non-inverting input end of the voltage comparator is electrically coupled to the data line drive unit, and the inverting input end of the voltage comparator is grounded, and an output end of the voltage comparator is electrically coupled to the pixel switch through the data line.

Each pixel region comprises three pixel switches, and the three pixel switches respectively control a red sub pixel, a green sub pixel and a blue sub pixel.

The embodiments of the present invention have advantages or benefits:

In the present invention, with providing the data line switch between the pixel electrode and the data line drive unit, the objective of disconnecting the pixel electrode and the data line drive unit as the data line drive unit does not output the signal can be achieved. Thus, it prevents the error reading phenomenon generated by the transistor leakage, and reduce the entire power consumption of the circuit to enhance the display brightness and the stability of the display image, and promote the display effect of the touch display panel. The touch display panel and the electronic apparatus of the present invention can prevent the error reading phenomenon generated by the transistor leakage, and reduce the entire power consumption of the circuit, and promote the display effect.

BRIEF DESCRIPTION OF THE DRAWINGS

In order to more clearly illustrate the embodiments of the present invention or prior art, the following FIGURES will be described in the embodiments are briefly introduced. It is obvious that the drawings are merely some embodiments of the present invention, those of ordinary skill in this field can obtain other figures according to these figures without paying the premise.

FIG. 1 is a circuit diagram of a touch display panel drive circuit according to the present invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Please refer to FIG. 1. The touch display panel drive circuit of the present invention comprises a data line drive unit 10, a pixel electrode, a data line switch 20, a plurality of gate lines and a plurality of data lines, and the plurality of gate lines are extended in a first direction A and separately aligned along a second direction B, and the plurality of data lines are extended in the second direction B and separately aligned along the first direction, and the plurality of data lines and the plurality of gate lines are insulated, and a junction of two adjacent gate lines and two adjacent data lines forms a pixel region. For instance, the gate lines G(n), G(n+1) and the data lines D(n), D(n+1) crisscrosses and forms a pixel region. A pixel switch 30 is provided in the pixel region, wherein the pixel switch 30 is electrically coupled to the corresponding gate line and data line, respectively. A data line switch 20 is further provided between the pixel switch 30 and the data line drive unit 10. As the data line drive unit 10 outputs the data signal (i.e. the current), the data line switch 20 is conducted, and the data line drive unit 10 and the pixel switch 30 form a path. Namely, the data line drive unit 10 and the pixel switch 30 form the path. As the data line drive unit 10 has no data signal output, the data line switch 20 is in an off state, and the data line drive unit 10 and the pixel switch 30 are disconnected. Namely, the data line drive unit 10 and the pixel switch 30 form an open circuit.

The working principle of the touch display panel according to the present invention is: as the touch display panel requires showing images, the gate drive unit (not shown in FIGURE) outputs the gate signal to the gate line, and the gate line transports the gate signal to the pixel switch 30 to control the pixel switch 30 to be in the on state. Meanwhile, the data line drive unit 10 can output the data signal, and the data signal is transmitted to the data line switch 20 through the corresponding data line. Then, the data line switch 20 is conducted, and the data signal can enter the pixel switch 30 so that the data line drive unit 10 and the pixel switch 30 form the path, and the touch display panel shows the corresponding images. When the touch display panel does not show images, and the pixel switch 30 is in the off state, due to the certain leakage phenomenon of the pixel switch 30 itself, there will be the leakage current flowing to the data line switch 20. Then, the data line drive unit 10 has not data signal output, and the data line switch 20 is in the off state, and the leakage current cannot pass through the data line switch 20 and the data line drive unit 10 to form a discharge circuit. Accordingly, it prevents the possibility that the data line may receive the noise signal generated by the leakage current of the other rows to prevent the occurrence of the error reading phenomenon. Thus, the entire power consumption is decreased to enhance the display brightness and the stability of the display image, and promote the display effect of the touch display panel.

In one specific embodiment, the data line switch 20 comprises a voltage comparator U, and a non-inverting input end of the voltage comparator U is electrically coupled to the data line drive unit 10, and the inverting input end of the voltage comparator U is grounded, and an output end is electrically coupled to the pixel switch. As the data line drive unit 10 transmits the data signal to the non-inverting input end of the voltage comparator U, the voltage comparator U can be conducted so that the data line drive unit 10 and the pixel switch form the path.

Furthermore, each pixel region comprises R (red), G (green), B (blue) sub pixels. Each sub pixel in the pixel region is controlled with one pixel switch 30. Namely, each pixel region comprises three pixel switches 30, and each pixel switch 30 corresponds to one sub pixel. The three pixel switches 30 in the same pixel region transmit the data signals through the same data line. Thus, the touch display drive circuit further comprises an image control unit 40 and a pixel select switch 50. The image control unit 40 receives the input image signals (R, G and B) and the plurality of input control signals employed for controlling the display of the input image signal, such as the vertical synchronizing signal Vsync, horizontal synchronizing signal Hsync, main clock signal MCLK, and data enable signal DE from the external graphics controller (not shown). The image control unit 40 properly processes the input image signals (R, G and B) according to the input control signals, and thus to generate the image data, which meets with the operation conditions of the touch display panel. The pixel select switch 50 is between the pixel switch 30 and the data line switch 20, and the image control unit 40 controls on and off of the pixel select switch 50 so that the data line drive unit 10 and the corresponding pixel switch 30 form the path. In one specific embodiment, as the pixel switch requires only showing the red sub pixel, the image control unit 40 controls the pixel select switch 50 corresponded with the red sub pixel to be conducted so that the pixel switch 30 corresponded with the red sub pixel and the data line drive unit 10 form the path, and the image control unit 40 controls the other two pixel select switches 50, which are respectively coupled with the green sub pixel and the blue sub pixel, to be off. Then, the pixel switch only shows the red sub pixel.

Furthermore, the pixel region further comprises a capacitor. The capacitor comprises a liquid crystal capacitor Clc and a storage capacitor Cst, and the liquid crystal capacitor Clc is between the pixel switch 20 and the common electrode 60. The common electrode 60 is shared with all the pixel regions in the touch display panel. In this embodiment, the common electrode is applied with a certain voltage Vcom in time. Thus, the transmission ratio of the liquid crystal capacitor Clc is changed to show the corresponding images. Moreover, for preventing the image signal leakage of writing the liquid crystal, the liquid crystal capacitor Clc formed between the pixel switch 30 and the common electrode 60 is coupled with the storage capacitor Cst in parallel. The storage capacitor Cst can maintain the voltage applied to the liquid crystal capacitor Clc to prevent the image signal leakage. The liquid crystal capacitor Clc and the storage capacitor Cst commonly act to be the drive loading of the LCD device.

It can be understood that the pixel switch 30 is the first thin film transistor, and the gate of the first thin film transistor is coupled to the gate line, and the source of the first thin film transistor is coupled to the data line, and the drain of the first thin film transistor is coupled to the capacitor (i.e. liquid crystal capacitor Clc and the storage capacitor Cst).

Preferably, the thin film transistor can be a PMOS thin film transistor, a NMOS thin film transistor or a CMOS thin film transistor.

Furthermore, the pixel select switch 50 also can utilize the second thin film transistor, and the source of the second thin film transistor is electrically coupled to the source of the first thin film transistor through the data line, and a gate of the second thin film transistor is electrically coupled to the image control unit, and a source of the second thin film transistor is electrically coupled to the data line drive unit 10. Preferably, the thin film transistor can be a PMOS thin film transistor, a NMOS thin film transistor or a CMOS thin film transistor.

The present invention further provides a touch display panel utilizing the drive circuit described as aforementioned.

The present invention further provides an electronic apparatus utilizing the aforesaid touch display panel. The touch display panel comprises any product or component with display function, such as the electronic paper, the liquid crystal TV, the mobile phone, the digital picture frame, the flat panel computer but not limited thereto.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. A touch display panel drive circuit, wherein the touch display panel drive circuit comprises a data line drive unit, a plurality of gate lines and a plurality of data lines, and the data line drive unit is employed to generate a data signal, and to provide the same to the plurality of data lines, and the plurality of gate lines are extended in a first direction and separately aligned along a second direction, and the plurality of data lines are extended in the second direction and separately aligned along the first direction, and the plurality of data lines and the plurality of gate lines are insulated, and a junction of two adjacent gate lines and two adjacent data lines forms a pixel region, and a pixel switch is located inside the pixel region; the touch display panel drive circuit further comprises a data line switch between the data line and the data line drive unit;

wherein the data line switch comprises a voltage comparator, and a non-inverting input end of the voltage comparator is electrically coupled to the data line drive unit, and the inverting input end of the voltage comparator is grounded, and an output end of the voltage comparator is electrically coupled to the pixel switch through the data line.

2. The touch display panel drive circuit according to claim 1, wherein as the data line drive unit outputs the data signal, the data line switch is conducted, and the data line drive unit and the pixel switch form a path.

3. The touch display panel drive circuit according to claim 1, wherein each pixel region comprises three pixel switches, and the three pixel switches respectively control a red sub pixel, a green sub pixel and a blue sub pixel.

4. The touch display panel drive circuit according to claim 3, wherein the touch display panel drive circuit further comprises an image control unit and three pixel select switches, and each of the pixel select switches is between one of the pixel switch and the data line switch, and the image control unit controls on and off of the pixel select switch, and as the pixel select switch is on, the pixel switch corresponded with the pixel select switch is on.

5. The touch display panel drive circuit according to claim 4, wherein the pixel switch comprises a first thin film transistor, and the pixel select switch comprises a second thin film transistor, and a gate of the first thin film transistor is electrically coupled to the gate line, and a source of the first thin film transistor is electrically coupled to a drain of the second thin film transistor, and a drain of the first thin film transistor is electrically coupled to a capacitor, and a gate of the second thin film transistor is electrically coupled to the image control unit, and a source of the second thin film transistor is electrically coupled to the data line drive unit.

6. The touch display panel drive circuit according to claim 5, wherein the first thin film transistor is a PMOS thin film transistor, a NMOS thin film transistor or a CMOS thin film transistor; the second thin film transistor is a PMOS thin film transistor, a NMOS thin film transistor or a CMOS thin film transistor.

7. The touch display panel drive circuit according to claim 5, wherein the capacitor comprises a liquid crystal capacitor and a storage capacitor, and one end of the liquid crystal capacitor is electrically coupled to the drain of the first thin film transistor, and the other end is coupled to a common electrode, and one end of the storage capacitor is electrically coupled to the drain of the first thin film transistor, and the other end is coupled to the common electrode.

8. A touch display panel comprising a drive circuit, wherein the drive circuit comprises a data line drive unit, a plurality of gate lines and a plurality of data lines, and the data line drive unit is employed to generate a data signal, and to provide the same to the plurality of data lines, and the plurality of gate lines are extended in a first direction and separately aligned along a second direction, and the plurality of data lines are extended in the second direction and separately aligned along the first direction, and the plurality of data lines and the plurality of gate lines are insulated, and a junction of two adjacent gate lines and two adjacent data lines forms a pixel region, and a pixel switch is located inside the pixel region; the touch display panel drive circuit further comprises a data line switch between the data line and the data line drive unit;

wherein the data line switch comprises a voltage comparator, and a non-inverting input end of the voltage comparator is electrically coupled to the data line drive unit, and the inverting input end of the voltage comparator is grounded, and an output end of the voltage comparator is electrically coupled to the pixel switch through the data line.

9. The touch display panel according to claim 8, wherein as the data line drive unit outputs the data signal, the data line switch is conducted, and the data line drive unit and the pixel switch form a path.

10. The touch display panel according to claim 8, wherein each pixel region comprises three pixel switches, and the three pixel switches respectively control a red sub pixel, a green sub pixel and a blue sub pixel.

11. The touch display panel according to claim 10, wherein the touch display panel drive circuit further comprises an image control unit and three pixel select switches, and each of the pixel select switches is between one of the pixel switch and the data line switch, and the image control unit controls on and off of the pixel select switch, and as the pixel select switch is on, the pixel switch corresponded with the pixel select switch is on.

12. The touch display panel according to claim 11, wherein the pixel switch comprises a first thin film transistor, and the pixel select switch comprises a second thin film transistor, and a gate of the first thin film transistor is electrically coupled to the gate line, and a source of the first thin film transistor is electrically coupled to a drain of the second thin film transistor, and a drain of the first thin film transistor is electrically coupled to a capacitor, and a gate of the second thin film transistor is electrically coupled to the image control unit, and a source of the second thin film transistor is electrically coupled to the data line drive unit.

13. The touch display panel according to claim 12, wherein the first thin film transistor is a PMOS thin film transistor, a NMOS thin film transistor or a CMOS thin film transistor; the second thin film transistor is a PMOS thin film transistor, a NMOS thin film transistor or a CMOS thin film transistor.

14. The touch display panel according to claim 12, wherein the capacitor comprises a liquid crystal capacitor and a storage capacitor, and one end of the liquid crystal capacitor is electrically coupled to the drain of the first thin film transistor, and the other end is coupled to a common electrode, and one end of the storage capacitor is electrically coupled to the drain of the first thin film transistor, and the other end is coupled to the common electrode.

15. An electronic apparatus, comprising a touch display panel and the touch display panel comprises a data line drive unit, a plurality of gate lines and a plurality of data lines, and the data line drive unit is employed to generate a data signal, and to provide the same to the plurality of data lines, and the plurality of gate lines are extended in a first direction and separately aligned along a second direction, and the plurality of data lines are extended in the second direction and separately aligned along the first direction, and the plurality of data lines and the plurality of gate lines are insulated, and a junction of two adjacent gate lines and two adjacent data lines forms a pixel region, and a pixel switch is located inside the pixel region; the touch display panel drive circuit further comprises a data line switch between the data line and the data line drive unit;

wherein the data line switch comprises a voltage comparator, and a non-inverting input end of the voltage comparator is electrically coupled to the data line drive unit, and the inverting input end of the voltage comparator is grounded, and an output end of the voltage comparator is electrically coupled to the pixel switch through the data line.

16. The electronic apparatus according to claim 15, wherein as the data line drive unit outputs the data signal, the data line switch is conducted, and the data line drive unit and the pixel switch form a path.

17. The electronic apparatus according to claim 15, wherein each pixel region comprises three pixel switches, and the three pixel switches respectively control a red sub pixel, a green sub pixel and a blue sub pixel.

* * * * *